US010832030B2

(12) United States Patent
Rhee et al.

(10) Patent No.: US 10,832,030 B2
(45) Date of Patent: Nov. 10, 2020

(54) METHOD AND APPARATUS OF SELECTING CANDIDATE FINGERPRINT IMAGE FOR FINGERPRINT RECOGNITION

(71) Applicant: Samsung Electronics Co., Ltd., Suwon-si (KR)

(72) Inventors: Seon Min Rhee, Seoul (KR); Kyuhong Kim, Seoul (KR); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 15/812,484

(22) Filed: Nov. 14, 2017

(65) Prior Publication Data
US 2018/0225494 A1 Aug. 9, 2018

(30) Foreign Application Priority Data
Feb. 8, 2017 (KR) ........................ 10-2017-0017656

(51) Int. Cl.
*G06K 9/00* (2006.01)
*G06K 9/46* (2006.01)
(52) U.S. Cl.
CPC .......... *G06K 9/001* (2013.01); *G06K 9/0008* (2013.01); *G06K 9/00013* (2013.01); *G06K 9/00067* (2013.01); *G06K 9/00087* (2013.01); *G06K 9/4642* (2013.01)
(58) Field of Classification Search
None
See application file for complete search history.

(56) References Cited

U.S. PATENT DOCUMENTS

| 5,953,442 A | 9/1999 | Dydyk et al. |
| 7,643,660 B1 * | 1/2010 | Bauchspies ............ G06K 9/001 382/124 |
| 9,367,728 B2 | 6/2016 | Chiang et al. |
| 2004/0151352 A1 * | 8/2004 | Nakajima .......... G06K 9/00087 382/124 |

(Continued)

FOREIGN PATENT DOCUMENTS

| EP | 3 086 262 A1 | 10/2016 |
| JP | 2016-40682 A | 3/2016 |

(Continued)

OTHER PUBLICATIONS

Partial European Search Report dated Jun. 14, 2018, in corresponding European Application No. 17208768.6 (11 pages, in English).

(Continued)

*Primary Examiner* — Hadi Akhavannik
(74) *Attorney, Agent, or Firm* — NSIP Law

(57) ABSTRACT

A method of selecting a candidate fingerprint image for fingerprint recognition includes acquiring a target fingerprint image, generating a target frequency image based on a frequency conversion of the target fingerprint image, extracting frequency feature information associated with a representative frequency from the target frequency image, and selecting a candidate fingerprint image from enrolled fingerprint images by comparing the frequency feature information to enrolled frequency information.

20 Claims, 12 Drawing Sheets

(56) References Cited

U.S. PATENT DOCUMENTS

| | | | |
|---|---|---|---|
| 2005/0226479 A1* | 10/2005 | Takahashi | G06K 9/00026 382/124 |
| 2007/0248249 A1* | 10/2007 | Stoianov | G06K 9/00087 382/124 |
| 2013/0051638 A1* | 2/2013 | Monden | A61B 5/1172 382/125 |
| 2015/0030216 A1* | 1/2015 | Abe | G06K 9/00067 382/124 |
| 2016/0070968 A1* | 3/2016 | Gu | G06K 9/00093 382/125 |
| 2017/0004346 A1* | 1/2017 | Kim | G06F 16/5866 |

FOREIGN PATENT DOCUMENTS

| | | |
|---|---|---|
| JP | 2016-40683 A | 3/2016 |
| JP | 5977899 B1 | 8/2016 |
| KR | 10-1180293 B1 | 9/2012 |
| KR | 10-1237148 B1 | 2/2013 |
| KR | 10-1244220 B1 | 3/2013 |
| KR | 10-1632912 B1 | 6/2016 |

OTHER PUBLICATIONS

Chih-Jen Lee, et al., "Fingerprint Identification Using Local Gabor Filters," *Proceedings of the Sixth International Conference on Networked Computing and Advanced Information Management (NCM)*, Piscataway, NJ, USA, Aug. 2010, pp. 626-631 (6 pages, in English).

Sunpreet S. Arora, et al., "Latent Fingerprint Matching: Performance Gain via Feedback from Exemplar Prints," *IEEE Transactions on Pattern Analysis and Machine Intelligence*, vol. 36, No. 12, Dec. 2014, pp. 2452-2465 (14 pages, in English).

Extended European Search Report dated Oct. 30, 2018, in corresponding European Application No. 17208768.6 (10 pages, in English).

\* cited by examiner

METHOD AND APPARATUS OF SELECTING CANDIDATE FINGERPRINT IMAGE FOR FINGERPRINT RECOGNITION

CROSS-REFERENCE TO RELATED APPLICATION(S)

This application claims the benefit under 35 USC § 119(a) of Korean Patent Application No. 10-2017-0017656, filed on Feb. 8, 2017, in the Korean Intellectual Property Office, the entire disclosure of which is incorporated herein by reference for all purposes.

BACKGROUND

1. Field

The following description relates to a technology of selecting a candidate fingerprint image for fingerprint recognition.

2. Description of Related Art

With recent developments in the field of mobile devices, such as smartphones and wearable devices, the importance of security and user authentication is increasing. A biometric authentication technology may be used to authenticate users based on, for example, a fingerprint, an iris, voice, a face, or a blood vessel. Because biometric characteristics used for authentication vary widely from person to person, are robust against forgery or falsification, are always with the user, and change very little over a lifetime, biometric authentication technology has been of keen interest recently.

Of these types of biometric authentication technology, fingerprint recognition technique has been widely commercialized because of its convenience, security, and low cost of implementation. The fingerprint recognition technique has been used to enhance a security of a user device and may easily secure application services, for example, a mobile payment.

Recently, due to miniaturization of portable devices, fingerprint sensing areas included in portable devices have also reduced in size. Thus, there is a desire for a technology of enrolling and recognizing a fingerprint using a fingerprint sensor configured to sense a only a portion of a fingerprint.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of selecting a candidate fingerprint image for fingerprint recognition includes acquiring a target fingerprint image, generating a target frequency image based on a frequency conversion of the target fingerprint image, extracting frequency feature information associated with a representative frequency from the target frequency image and selecting a candidate fingerprint image from enrolled fingerprint images by comparing the frequency feature information to enrolled frequency information.

The method may further include determining whether the candidate fingerprint image matches the target fingerprint image.

The determining of whether the candidate fingerprint image matches the target fingerprint image may further include calculating a matching level between the candidate fingerprint image and the target fingerprint image and determining that candidate fingerprint image matches the target fingerprint image in response to the matching level exceeding a threshold level.

The acquiring of the target fingerprint image may include acquiring an input fingerprint image and acquiring the target fingerprint image by dividing the acquired input fingerprint image into sub-blocks.

The extracting of the frequency feature information may include extracting frequency information associated with a ridge of a fingerprint included in the target fingerprint image from the target frequency image.

The extracting of the frequency feature information may include extracting, from the target frequency image, at least one of a frequency distribution, frequency information representing a ridge interval of a fingerprint included in the target fingerprint image, and frequency information representing a ridge direction of the fingerprint.

The frequency information representing the ridge interval may include information associated with a distance between an origin point and a representative point in the target frequency image.

The frequency information representing the ridge direction may include information associated with a magnitude of a representative point.

The selecting of the candidate fingerprint image may include comparing target frequency information of the enrolled fingerprint images to target frequency information determined based on at least one of a frequency distribution, a frequency representing a ridge interval of a fingerprint included in the target fingerprint image, and a frequency representing a ridge direction of the fingerprint, and determining a similarity based on the comparing of the target frequency information of the enrolled fingerprint image.

The extracting of the frequency feature information may include determining a representative point representing the target frequency image, and calculating, as the frequency feature information, a magnitude of the representative point and a representative distance between the representative point and an origin point included in the target frequency image.

The extracting of the frequency feature information may include determining frequency information associated with a representative point with a greatest magnitude among a plurality of points included in the target frequency image.

The extracting of the frequency feature information may include selecting a preset number of representative points based on a magnitude order from a plurality of points included in the target frequency image, and extracting frequency information associated with the selected representative points as the frequency feature information.

The extracting of the frequency information associated with the selected representative points as the frequency feature information may include calculating a frequency feature vector based on a representative distance between the selected representative points and an origin included in the target frequency image.

The acquiring of the target fingerprint image may include acquiring an input fingerprint image having a same size as an enrolled fingerprint image.

The method may further include determining a non-candidate fingerprint image among the enrolled fingerprint images based on a result of the comparing of the frequency feature information to the enrolled frequency information, and recognizing the target fingerprint image by excluding the non-candidate fingerprint image.

The method may further include extracting enrolled frequency feature information by performing a frequency conversion of an enrolled fingerprint image, and mapping the enrolled frequency feature information and the enrolled fingerprint image and storing the enrolled frequency feature information and the enrolled fingerprint image in a database (DB).

The extracting of the frequency feature information may include extracting distribution information of points with magnitudes greater than or equal to a threshold magnitude from the target frequency image.

The extracting of the frequency feature information may include extracting the frequency feature information by excluding a point corresponding to a frequency component that is less than a threshold frequency from the target frequency image.

The selecting of the candidate fingerprint image may include calculating a similarity between the target frequency image and an enrolled frequency image based on at least one of a difference between a representative distance of the target frequency image and a representative distance of an enrolled frequency image, a vector distance between a frequency feature vector of the target frequency image and a frequency feature vector of the enrolled frequency image, and a cosine similarity between the frequency feature vectors.

The selecting of the candidate fingerprint image may include selecting, as the candidate fingerprint image, an enrolled fingerprint image of which a similarity between the frequency feature information and the enrolled frequency information is greater than a threshold.

A non-transitory computer-readable storage medium stores instructions that, when executed by a processor, cause the processor to perform the above-described method.

In a general aspect, an apparatus for selecting a candidate fingerprint image for fingerprint recognition includes an image acquirer configured to acquire a target fingerprint image and a processor configured to generate a target frequency image by performing a frequency conversion of the target fingerprint image, to extract frequency feature information associated with a representative frequency from the target frequency image, and to select a candidate fingerprint image from enrolled fingerprint images by comparing the frequency feature information to enrolled frequency information.

Other features and aspects will be apparent from the following detailed description, the drawings, and the claims.

Figure 1:
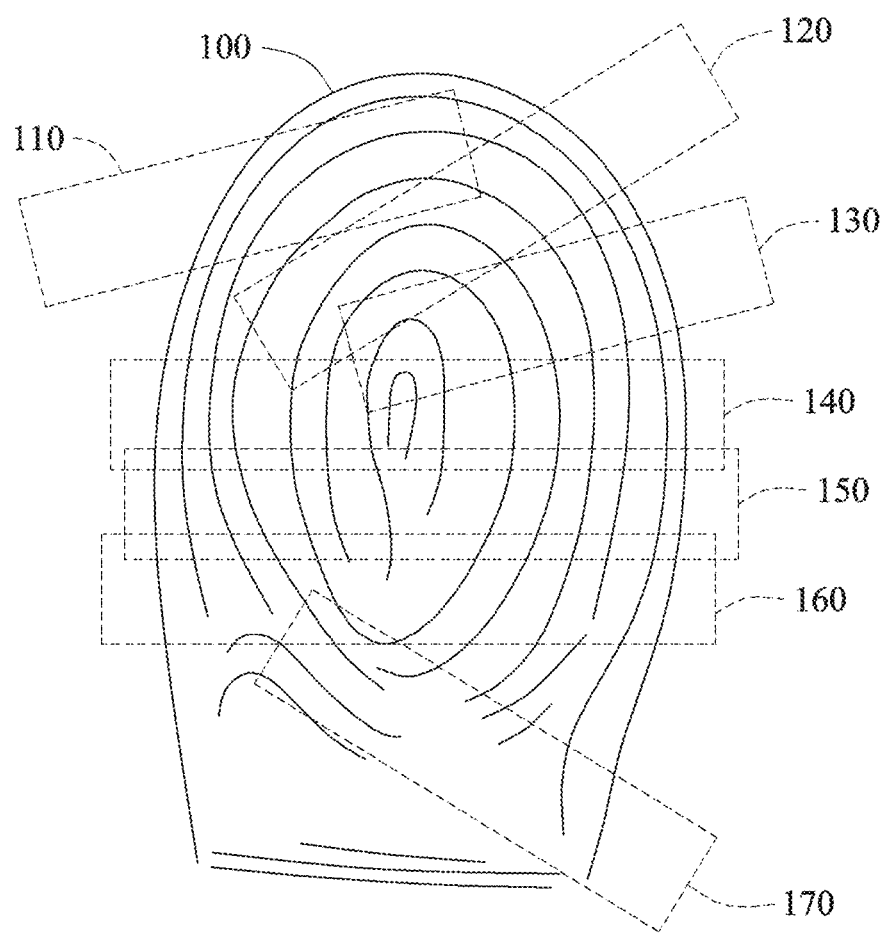
FIG. 1 is a diagram illustrating an example of a fingerprint image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the present application, however, should not be construed as limited to the examples set forth herein. Like reference numerals in the drawings refer to like elements throughout the present disclosure.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical or scientific terms used herein have the same meanings as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Regarding the reference numerals assigned to the components in the drawings, it should be noted that the same components will be designated by the same reference numerals, wherever possible, even though they are shown in different drawings. Also, in describing of examples, detailed description of well-known related structures or functions will be omitted when it is deemed that such description will cause ambiguous interpretation of the present disclosure.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a fingerprint image.

Referring to FIG. 1, a fingerprint 100 of a user is sensed by a fingerprint sensor (not shown). The fingerprint sensor senses the fingerprint 100 through a sensing area. A size of the sensing area of the fingerprint sensor is less than a size of the fingerprint 100. For example, the sensing area has a rectangular shape smaller than the size of the fingerprint 100. In this example, the fingerprint sensor senses a portion of the fingerprint 100 through the sensing area.

The fingerprint sensor generates a fingerprint image by capturing the sensed fingerprint. When the size of the sensing area is less than the size of the fingerprint 100, the generated fingerprint image corresponds to a partial image including a portion of the fingerprint 100.

The fingerprint image is used to enroll or recognize the fingerprint 100. For example, in an enrollment operation, the fingerprint image is enrolled. The enrolled fingerprint image is stored in a storage (memory) that is provided in advance. When the size of the sensing area of the fingerprint sensor is less than the size of the fingerprint 100, a plurality of fingerprint images corresponding to partial images of the fingerprint 100 are enrolled. For example, a plurality of partial images, for example, partial images 110, 120, 130, 140, 150, 160, and 170 are enrolled. Each of the partial images 110 through 170 includes a portion of the fingerprint 100, and the partial images 110 through 170 are collected to cover a substantial portion of the fingerprint 100. In this example, the partial images 110 through 170 overlap each other. For convenience of description, an image representing a pre-enrolled fingerprint may be referred to as an "enrolled fingerprint image."

A fingerprint image may be recognized in a recognition operation. For example, in the recognition operation, the fingerprint image is compared to a pre-enrolled fingerprint image. Based on whether the fingerprint image matches the pre-enrolled fingerprint image, a user authentication result or a user identification result is obtained. When the size of the sensing area is less than the size of the fingerprint 100, the fingerprint image corresponds to a partial image of the fingerprint 100. In the following description, for convenience of description, an image representing a fingerprint of a user may be referred to as an "input fingerprint image." Examples provide a scheme of recognizing a fingerprint by comparing the input fingerprint image to enrolled fingerprint images, which will be further described below. For example, an apparatus (hereinafter, referred to as a "candidate fingerprint selection apparatus") for selecting a candidate fingerprint image for fingerprint recognition compares a target fingerprint image obtained by dividing an input fingerprint image to at least a portion of an enrolled fingerprint image.

Although the sensing area of the fingerprint sensor has a rectangular shape as shown in FIG. 1, various sizes and shapes are applicable to the sensing area. For example, the sensing area may have a circular shape, or may include mixed shapes.

Depending on examples, a fingerprint sensor used in the enrollment operation is different from a fingerprint sensor used in the recognition operation. For example, a fingerprint sensor having a rectangular-shaped sensing area as shown in FIG. 1 is used in the enrollment operation, and a fingerprint sensor having a circular-shaped sensing area is used in the recognition operation. As described above, a user recognition needs to be performed based on a portion of a fingerprint, and it is important to quickly select a candidate fingerprint image that can be compared from enrolled fingerprint images in a fingerprint recognition process. In the following description, selecting of a candidate fingerprint image from enrolled fingerprint images includes, for example, selecting at least one of enrolled fingerprint images as a candidate fingerprint image.

Figure 2:
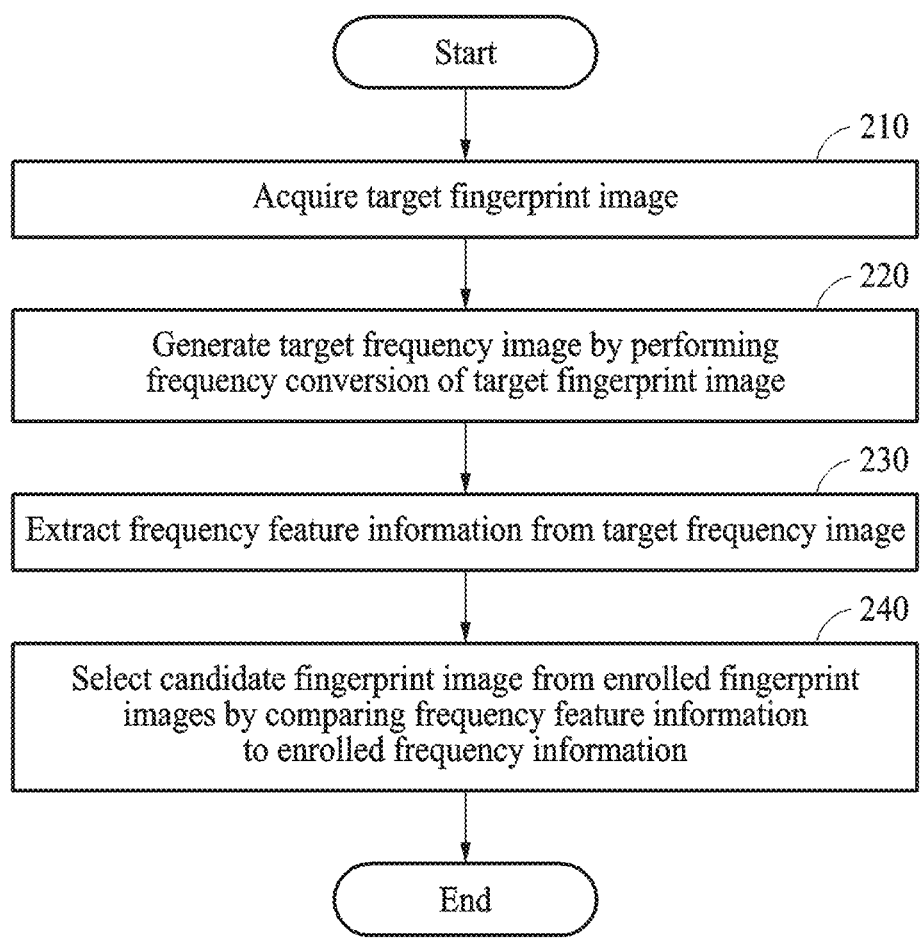
FIG. 2 is a flowchart illustrating an example of a method of selecting a candidate fingerprint image for fingerprint recognition.

FIG. 2 illustrates an example of a method of selecting a candidate fingerprint image for fingerprint recognition.

Referring to FIG. 2, in operation 210, a candidate fingerprint selection apparatus acquires a target fingerprint image. The target fingerprint image may be acquired by a fingerprint sensor, or may have been previously acquired. The target fingerprint image is an image including at least a portion of a fingerprint that is to be recognized. The target fingerprint image is, for example, an image obtained by dividing an input fingerprint image, however, is not limited thereto. For example, the input fingerprint image is used as the target fingerprint image.

In operation 220, the candidate fingerprint selection apparatus generates a target frequency image by performing a frequency conversion of the target fingerprint image. For example, the candidate fingerprint selection apparatus converts a target fingerprint image from a spatial domain to a frequency domain. The target fingerprint image and the target frequency image will be further described with reference to FIG. 4.

In operation 230, the candidate fingerprint selection apparatus extracts frequency feature information associated with a representative frequency from the target frequency image. The frequency feature information is, for example, information indicating a frequency feature of the target frequency image.

In the following description, the representative frequency is a frequency representative of the target frequency image. The representative frequency includes, for example, a frequency component corresponding to representative points with magnitudes that are greater than or equal to a threshold magnitude in the target frequency image. The representative points will be further described with reference to FIG. 4.

In operation 240, the candidate fingerprint selection apparatus selects a candidate fingerprint image from enrolled fingerprint images by comparing the frequency feature information to enrolled frequency information. The candidate fingerprint image is an image used to determine whether an enrolled fingerprint image matches the target fingerprint image. For example, the candidate fingerprint selection apparatus determines whether the candidate fingerprint image matches the target fingerprint image, instead of matching fingerprints of all the enrolled fingerprint images. Thus, the candidate fingerprint selection apparatus reduces a number of times a matching operation is performed, and decreases the amount of time used for fingerprint recognition.

Figure 3:
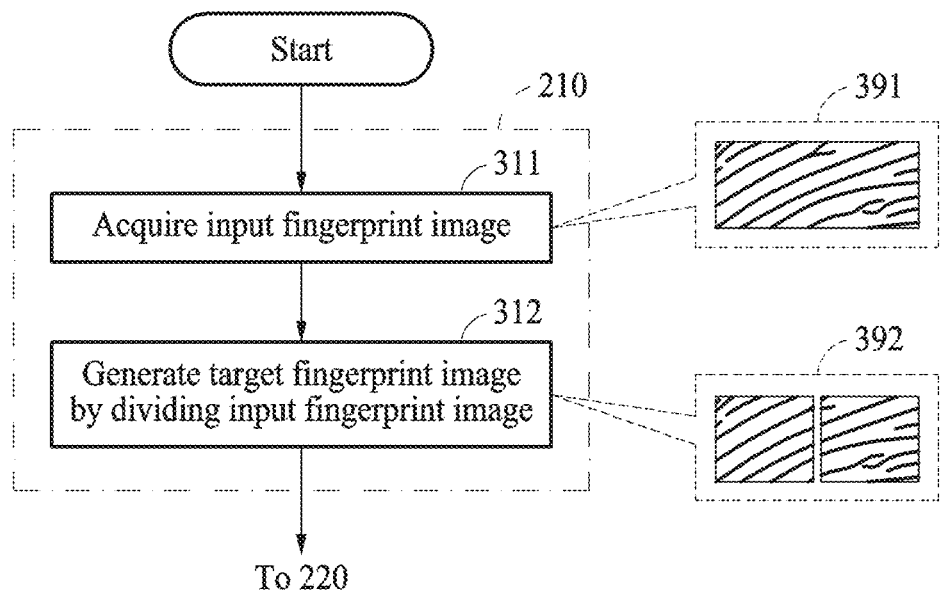
FIG. 3 is a flowchart illustrating an example of dividing an input fingerprint image in the method of FIG. 2.

FIG. 3 illustrates an example of dividing the input fingerprint image in the method of FIG. 2.

Referring to FIG. 3, in operation 311, the candidate fingerprint selection apparatus acquires an input fingerprint image 391. The input fingerprint image 391 is a fingerprint image input to the candidate fingerprint selection apparatus, and includes, for example, a fingerprint image representing at least a portion of a fingerprint. For example, the acquired input fingerprint image 391 has the same size as that of an enrolled fingerprint image, however, there is no limitation thereto.

In operation 312, the candidate fingerprint selection apparatus divides the input fingerprint image 391 into target fingerprint images 392. The target fingerprint images 392 are images defined in a spatial domain. For example, the target fingerprint images 392 are two-dimensional (2D) images and include a plurality of pixels. A pixel value of each of pixels of the target fingerprint images 392 indicates an intensity corresponding to a spatial location of each of the pixels, and the intensity is, for example, a brightness. However, the intensity is not limited to the brightness, and includes, for example, a pixel value (for example, RGB values or CYB values) indicating color and/or a depth value (for example, a value acquired by a depth sensor) indicating a distance to an object.

Figure 4:
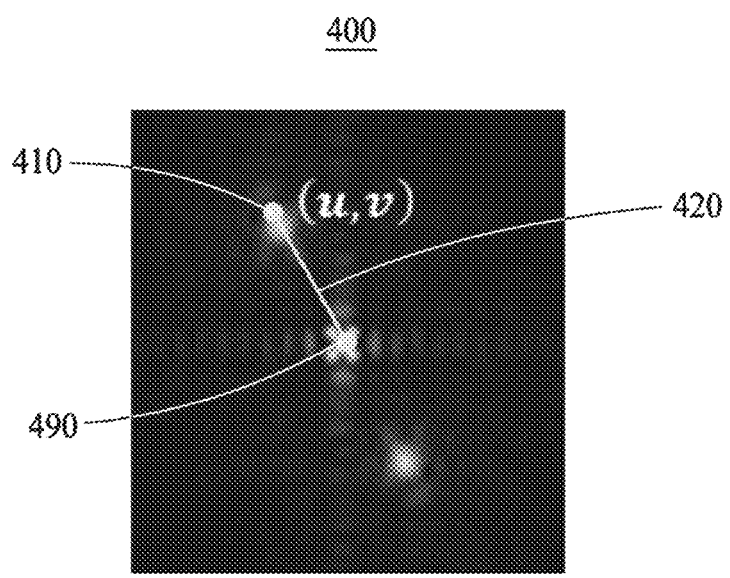
FIG. 4 is a diagram illustrating an example of a target frequency image.

FIG. 4 illustrates an example of a target frequency image 400.

The target frequency image 400 is an image obtained by converting a target fingerprint image from a spatial domain to a frequency domain. For example, when a target fingerprint image is a 2D image, the target frequency image 400 is also a 2D image and includes a plurality of points, and a magnitude is mapped to each of the points. A magnitude of each of the points of the target frequency image 400 is a level (for example, a frequency) to which a frequency component corresponding to each of the points is present. For example, a frequency component of the target frequency image 400 represents a degree to which a brightness of a pixel of the target fingerprint image changes.

As shown in FIG. 4, a magnitude of a first point 410 in the target frequency image 400 indicates a level to which a frequency component (for example, denoted by u) corresponding to the first point 410 in a first frequency axis and a frequency component (for example, denoted by v) corresponding to the first point 410 in a second frequency axis are present. The first frequency axis and the second frequency axis are represented as a horizontal axis and a vertical axis, respectively, in FIG. 4. For example, when the level described above increases, a brightness of the first point 410 increases. A candidate fingerprint selection apparatus calculates a distance 420 between an origin 490 and the first point 410. The candidate fingerprint selection apparatus extracts the magnitude of the first point 410 and the distance 420 as frequency feature information. The first point 410 is a representative point of the target frequency image 400.

For example, the candidate fingerprint selection apparatus extracts, from a target frequency image, at least one of a frequency distribution, frequency information representing a ridge interval of a fingerprint included in a target fingerprint image, and frequency information representing a ridge direction of the fingerprint. The frequency information representing the ridge interval includes, for example, information associated with a distance (for example, the distance 420) between an origin and a representative point, and the frequency information representing the ridge direction includes, for example, information associated with a magnitude of a representative point.

The frequency distribution corresponds to information indicating a distribution of representative points in the target frequency image 400. For example, the frequency distribution includes distribution information (for example, a variance value, a standard deviation value, etc.) indicating a distribution of representative points with magnitudes that are greater than or equal to a predetermined value based on the first point 410. The candidate fingerprint selection apparatus extracts distribution information of representative points with magnitudes greater than or equal to a threshold magnitude as frequency feature information from the target frequency image 400. Also, the candidate fingerprint selection apparatus extracts the frequency feature information by excluding a point corresponding to a frequency component that is less than or equal to a threshold frequency from the target frequency image. The point corresponding to the frequency component appears along the first frequency axis and the second frequency axis, and is, for example, a point less associated with a representative point. Accordingly, the candidate fingerprint selection apparatus excludes the point corresponding to the frequency component, and includes features associated with the representative point in frequency feature information.

The candidate fingerprint selection apparatus determines a representative point of the target frequency image 400. The candidate fingerprint selection apparatus calculates, as frequency feature information, a magnitude of the representative point and a representative distance (for example, the distance 420) between the representative point and an origin included in the target frequency image, for example.

Also, the candidate fingerprint selection apparatus determines frequency information associated with a representative point with a greatest magnitude among the plurality of points included in the target frequency image 400.

Examples of extracting frequency feature information will be further described with reference to FIGS. 5 and 6.

Figure 5:
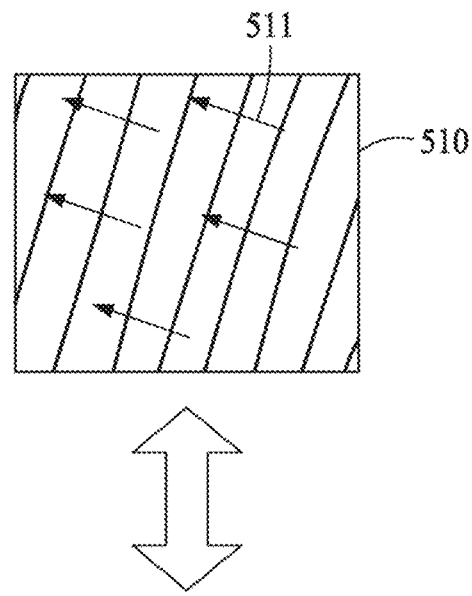
FIGS. 5 and 6 are diagrams illustrating examples of extracting frequency feature information from a target frequency image.
Figure 5:
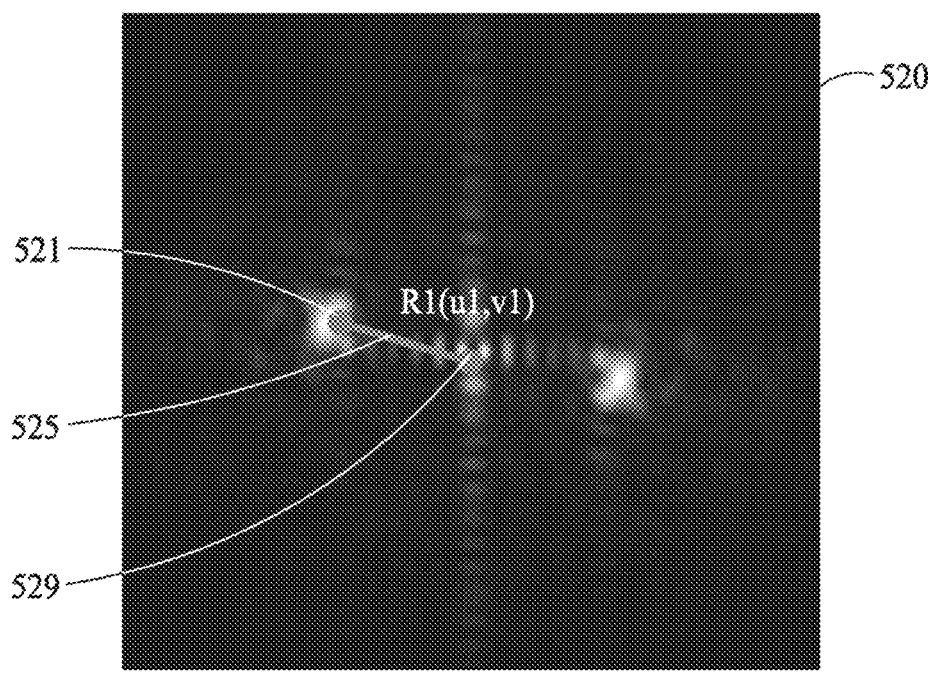
Figure 6:
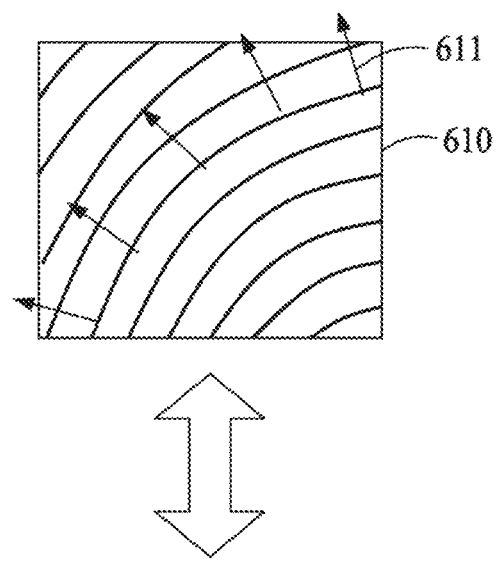
Figure 6:
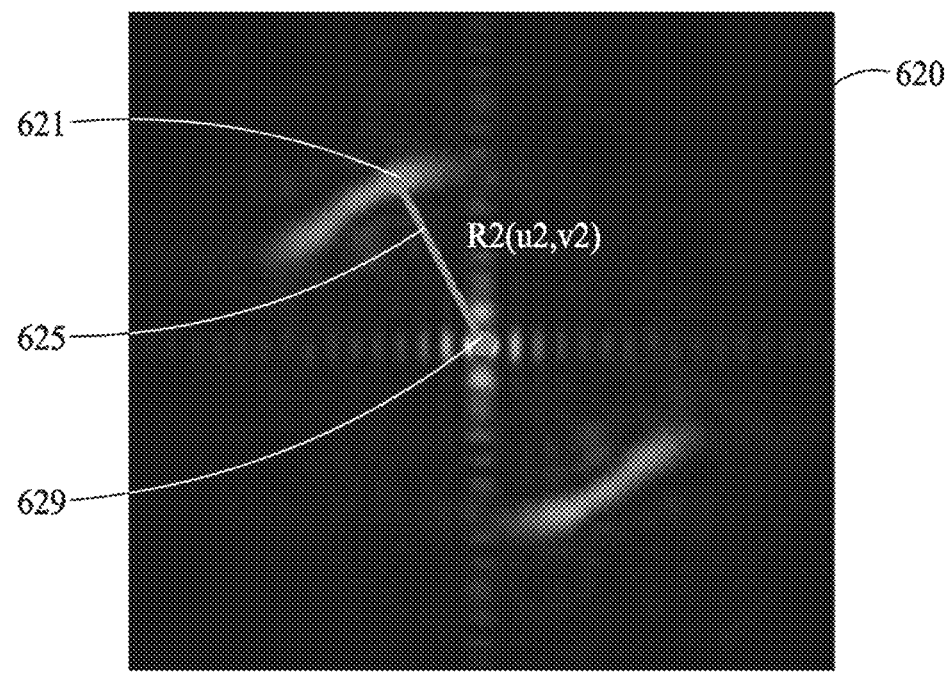

FIGS. 5 and 6 illustrate examples of extracting frequency feature information from a target frequency image.

Referring to FIGS. 5 and 6, a candidate fingerprint selection apparatus generates target frequency images 520 and 620 by performing a frequency conversion of target fingerprint images 510 and 610. The candidate fingerprint selection apparatus utilizes a frequency feature of an input fingerprint image, to quickly select a candidate fingerprint image similar to the input fingerprint image among enrolled fingerprint images.

For example, the candidate fingerprint selection apparatus extracts frequency information associated with a ridge of a fingerprint included in each of the target fingerprint images 510 and 610 from the target frequency images 520 and 620. The frequency information associated with the ridge includes a frequency feature associated with a ridge interval, a ridge direction, and/or a frequency distribution as a representative characteristic of the fingerprint. The frequency information associated with the ridge includes, for example, a magnitude of each of the points in the target frequency images 520 and 620, distances 525 and 625 between origins 529 and 629 and points (for example, a frequency position of a representative point) with a peak magnitude, or a peak magnitude value. The origins 529 and 629 are central points of the target frequency images 520 and 620. In the target frequency images 520 and 620, representative points 521 and 621 have peak magnitude values, however, a point with a peak magnitude value is not limited to the representative points 521 and 621. The representative points 521 and 621 are representative of the target frequency images 520 and 620, respectively, and are, for example, a plurality of points with magnitudes greater than or equal to a threshold magnitude.

Frequency information representing a ridge interval includes, for example, the distances 525 and 625 between the origins 529 and 629 and the representative points 521 and 621 in the target frequency images 520 and 620. The distances 525 and 625 are expressed by "R(u,v)=sqrt(u*u+v*v)" in which u denotes a frequency component (for example, a frequency position) in a first frequency axis corresponding to the representative points 521 and 621, and v denotes a frequency component in a second frequency axis corresponding to the representative points 521 and 621 where sqrt denotes a square root operation. When a magnitude of R increases, a ridge interval decreases. When the magnitude of R decreases, the ridge interval increases.

Frequency information representing ridge directions 511 and 611 includes, for example, magnitudes (for example, peak magnitudes) of the representative points 521 and 621 in the target frequency images 520 and 620. For example, magnitude values of the representative points 521 and 621 are expressed by "M(u,v)=Intensity@(u,v)" in which Intensity@(u, v) denotes a value of an intensity at a point with a frequency position of u in the first frequency axis and v in the second frequency axis in the target frequency images 520 and 620. When a value of M increases, the ridge directions 511 and 611 become similar to each other. When the value of M decreases, the ridge directions 511 and 611 are different from each other.

Referring to FIG. 5, the target fingerprint image 510 has a wide interval between ridges and a dominant direction (for example, a direction similar to the ridge direction 511). Due to the wide interval between the ridges in the target fingerprint image 510, the distance 525 as a representative distance between the origin 529 and a position (u1, v1) of the representative point 521 in the target frequency image 520 decreases. Also, because the ridge direction 511 is dominant, the representative point 521 has a magnitude value greater than that of the representative point 621.

Referring to FIG. 6, in the target fingerprint image 610 has a narrow interval between ridges and does not have dominant direction due to the curved nature of the ridges. Due to the narrow interval between the ridges in the target fingerprint image 610, the distance 625 between the origin 629 and a position (u2, v2) of the representative point 621 in the target frequency image 620 increases. Also, because ridge directions 611 do not have a dominant direction, the representative point 621 has a magnitude value less than that of the representative point 521.

Figure 7:
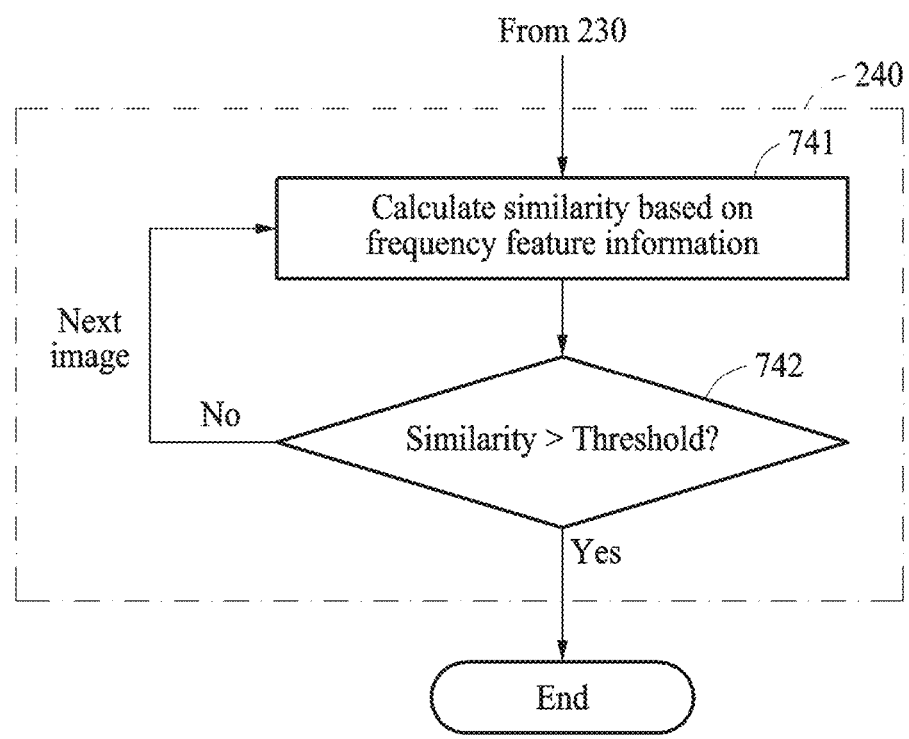
FIG. 7 is a diagram illustrating an example of calculating a similarity based on frequency feature information in the method of FIG. 2.

FIG. 7 illustrates an example of calculating a similarity based on frequency feature information in the method of FIG. 2.

A candidate fingerprint selection apparatus compares target frequency feature information to enrolled frequency information to select a candidate fingerprint image from enrolled fingerprint images.

Referring to FIG. 7, in operation 741, the candidate fingerprint selection apparatus calculates a similarity based on frequency feature information. For example, the candidate fingerprint selection apparatus calculates a similarity by comparing frequency feature information extracted from a target frequency image to enrolled frequency information extracted from an enrolled frequency image. The enrolled frequency image is an image representing a frequency component of an enrolled fingerprint image stored in a database (DB), and is mapped to the enrolled fingerprint image and stored.

The candidate fingerprint selection apparatus calculates a similarity by comparing target frequency information of an enrolled fingerprint image to target frequency information determined based on at least one of a frequency distribution, a frequency representing a ridge interval of a fingerprint included in the target fingerprint image, and a frequency representing a ridge direction of the fingerprint. The candidate fingerprint selection apparatus calculates a similarity between the target frequency image and the enrolled frequency image based on at least one of a difference between a representative distance of the target frequency image and a representative distance of the enrolled frequency image, a vector distance between a frequency feature vector of the target frequency image and a frequency feature vector of the enrolled frequency image, or a cosine similarity between the frequency feature vectors.

For example, the difference between the representative distances is expressed by $D_1(F, F')=|F-F'|$ in which F denotes the representative distance of the target frequency image, and F' denotes the representative distance of the enrolled frequency image.

When a plurality of representative points are extracted from the target frequency image, the candidate fingerprint selection apparatus calculates a feature vector distance between the frequency feature vector of the target frequency image and the frequency feature vector of the enrolled frequency image. For example, the candidate fingerprint selection apparatus calculates the feature vector distance between the frequency feature vectors as $D_2(\vec{F}, \vec{F'})=\|\vec{F}, \vec{F'}\|_2$ (for example, L2 Norm). In this example, $\vec{F}$ denotes the frequency feature vector of the target frequency image and is expressed by, for example, $\vec{F}=(f_1, f_2, f_3, f_4, f_5 \ldots)$ in which $f_1$, $f_2$, and the like denote representative distances to the representative points in the target frequency image. Also, $\vec{F'}$ denotes the frequency feature vector of the enrolled frequency image and is expressed by, for example, $\vec{F'}=(f_1', f_2', f_3', f_4', f_5', \ldots)$ in which $f_1'$, $f_2'$, and the like denote representative distances to representative points in the enrolled frequency image.

The candidate fingerprint selection apparatus calculates a similarity (for example, a cosine similarity) between two feature vectors using $S(\vec{F}, \vec{F'})=\vec{F}\vec{F'}/\|\vec{F}\|*\|\vec{F'}\|$.

When the similarity is greater than a threshold value, the two feature vectors are determined to be similar to each other. When the similarity is less than the threshold, the two feature vectors are determined to be different from each other. When the feature vector distance is less than a threshold, the frequency feature vectors are determined to be similar to each other. When the feature vector distance is greater than the threshold, the frequency feature vectors are determined to be different from each other.

In operation 742, the candidate fingerprint selection apparatus determines whether the similarity is greater than a threshold. In an example, when a similarity between the frequency feature information and the enrolled frequency information is greater than the threshold, the candidate fingerprint selection apparatus selects the enrolled fingerprint image as a candidate fingerprint image. In another example, when the similarity is less than or equal to the threshold, the candidate fingerprint selection apparatus calculates a similarity associated with a next image of the enrolled fingerprint image that is currently compared among enrolled fingerprint images stored in the DB.

Figure 8:
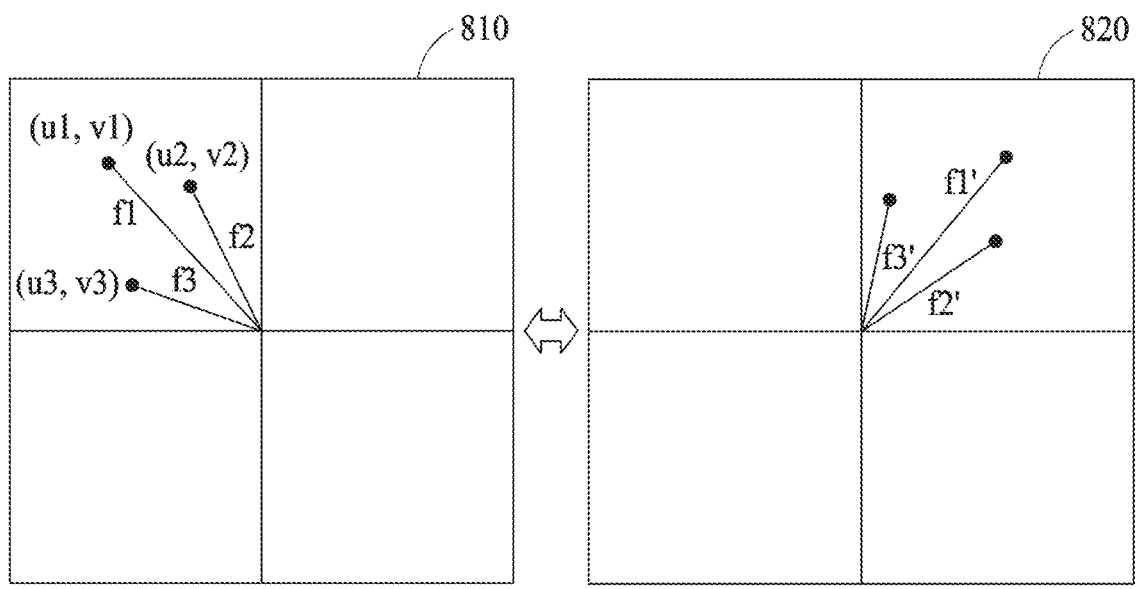
FIG. 8 is a diagram illustrating an example of a frequency feature vector.

FIG. 8 illustrates an example of a frequency feature vector.

A candidate fingerprint selection apparatus selects a preset number of representative points based on a magnitude order from a plurality of points included in a target frequency image 810. The candidate fingerprint selection apparatus extracts frequency information associated with each of the representative points as frequency feature information. An example in which three representative points are selected is described with reference to FIG. 8, however, a number of representative points to be selected is not limited to three and can be any number.

The candidate fingerprint selection apparatus calculates a frequency feature vector based on a representative distance between an origin and the number of representative points. The frequency feature vector is a vector that includes, as an element, a representative distance associated with each of a plurality of representative points. For example, in FIG. 8, $\vec{F}$ denotes a frequency feature vector of the target frequency image 810 and is expressed by, for example, $\vec{F}=(f1, f2, f3)$. Also, f1 denotes a representative distance from an origin to a frequency position of a representative point (u1, v1), f2 denotes a representative distance from the origin to a frequency position of a representative point (u2, v2), and f3 denotes a representative distance from the origin to a frequency position of a representative point (u3, v3). Also, l(u, v) denotes a magnitude value at a frequency position of a point (u, v). In the example of FIG. 8, the representative point (u1, v1) has a highest magnitude value and the representative point (u3, v3) has a lowest magnitude value.

Also, the candidate fingerprint selection apparatus calculates a frequency feature vector of an enrolled frequency image 820.

As described above, the candidate fingerprint selection apparatus calculates the frequency feature vector of the target frequency image 810 and the frequency feature vector of the enrolled frequency image 820, and calculates a similarity between the frequency feature vectors.

Figure 9:
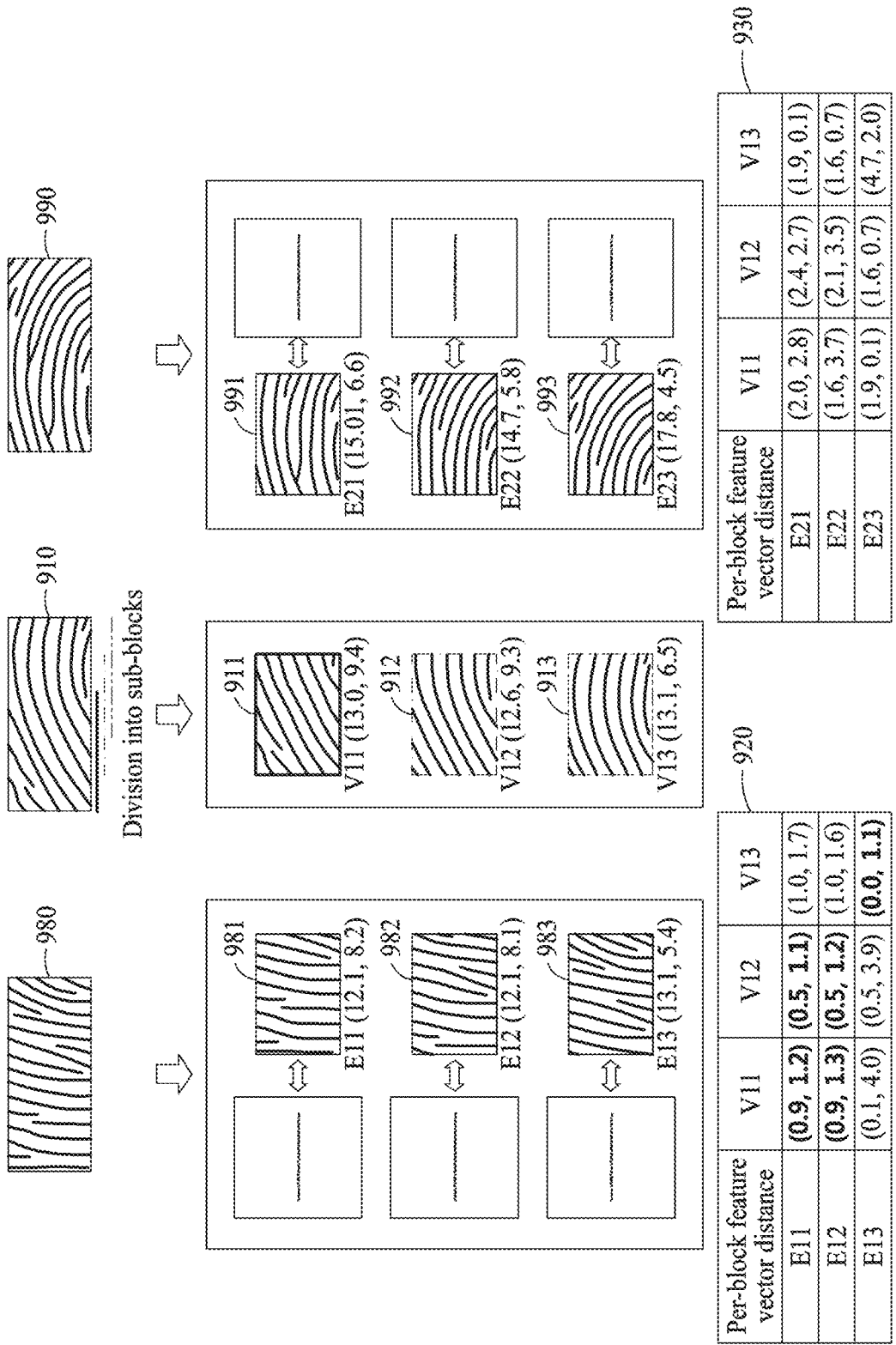
FIG. 9 is a diagram illustrating an example of selecting a candidate fingerprint image.

FIG. 9 illustrates an example of selecting a candidate fingerprint image.

A candidate fingerprint selection apparatus divides an input fingerprint image 910 into target fingerprint images 911, 912, and 913, extracts frequency feature information from each of the target fingerprint images 911, 912, and 913, and calculates a feature vector distance to each of enrolled fingerprint images.

For example, the candidate fingerprint selection apparatus calculates feature vector distances between the target fingerprint images 911, 912 and 913 and each of first enrolled fingerprint images 981, 982 and 983, and feature vector distances between the target fingerprint images 911, 912 and 913 and each of second enrolled fingerprint images 991, 992 and 993. The first enrolled fingerprint images 981, 982 and 983 are obtained by dividing a first enrolled fingerprint 980 into sub-blocks, and the second enrolled fingerprint images 991, 992 and 993 are obtained by dividing a second enrolled fingerprint 990 into sub-blocks.

The candidate fingerprint selection apparatus selects, as a candidate fingerprint image, an enrolled fingerprint image that is determined to be less than a threshold (1.5, 1.5) with respect to all the target fingerprint images 911, 912 and 913. For example, the candidate fingerprint selection apparatus calculates a feature vector distance to each of the first enrolled fingerprint images 981, 982 and 983, and determines a similarity based on whether the feature vector distance is less than a threshold (the threshold (1.5, 1.5)). As shown in tables 920 and 930 of FIG. 9, feature vector distances less than the threshold (1.5, 1.5) are marked in bold type. When feature vector distances are less than the threshold (1.5, 1.5) as shown in the table 920, the candidate fingerprint selection apparatus determines the first enrolled fingerprint images 981, 982, and 983 as candidate fingerprint images, however, there is no limitation thereto. In an example, the candidate fingerprint selection apparatus calculates feature vector distances between a target fingerprint image and enrolled fingerprint images obtained by dividing an enrolled fingerprint. In this example, when at least one of the calculated feature vector distances is less than a threshold, corresponding enrolled fingerprint images are determined as candidate fingerprint images. In another example, a similarity is used instead of the feature vector distance. In this example, when a single enrolled fingerprint image with a feature vector distance that is greater than or equal to a threshold is present, the candidate fingerprint selection apparatus determines the other enrolled fingerprint images (for example, the same enrolled fingerprint) associated with the enrolled fingerprint image as candidate fingerprint images.

Figure 10:
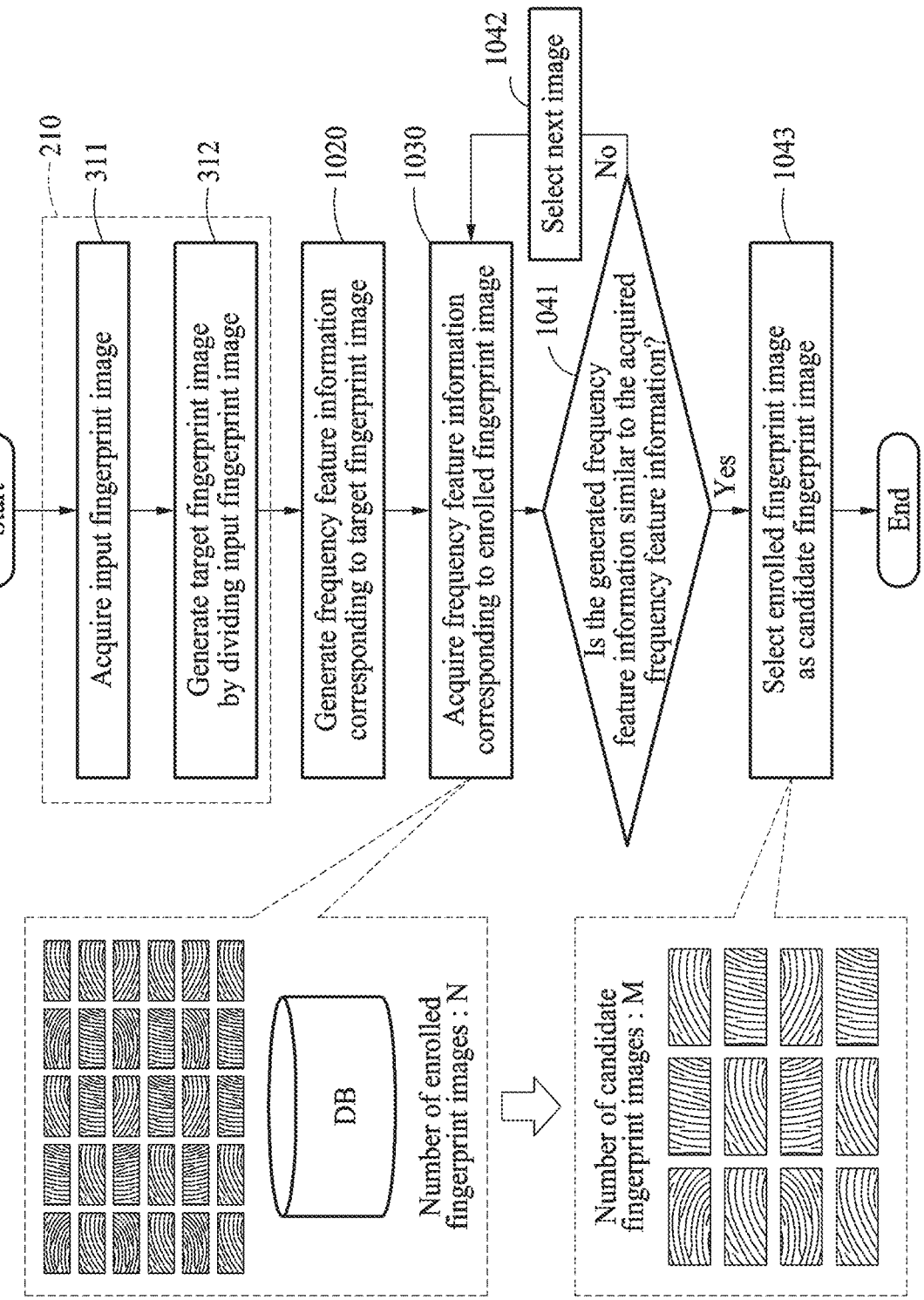
FIG. 10 is a flowchart illustrating another example of a method of selecting a candidate fingerprint image for fingerprint recognition.

FIG. 10 illustrates another example of a method of selecting a candidate fingerprint image for fingerprint recognition.

Referring to FIG. 10, in operation 311, a candidate fingerprint selection apparatus acquires an input fingerprint image. In operation 312, the candidate fingerprint selection apparatus generates a target fingerprint image by dividing the input fingerprint image into sub-blocks. The description of FIG. 3 is also applicable to operations 311 and 312, and accordingly is not repeated here.

In operation 1020, the candidate fingerprint selection apparatus generates frequency feature information corresponding to the target fingerprint image. The description of FIGS. 4 through 6 is also applicable to operation 1020, and accordingly is not repeated here.

In operation 1030, the candidate fingerprint selection apparatus acquires frequency feature information corresponding to an enrolled fingerprint image. For example, the candidate fingerprint selection apparatus acquires frequency feature information mapped to an enrolled fingerprint image from a database (DB). A number of enrolled fingerprint images stored in the DB is N and N is an integer greater than or equal to "1."

In operation 1041, the candidate fingerprint selection apparatus compares the frequency feature information generated in operation 1020 to the frequency feature information acquired in operation 1030. For example, the candidate fingerprint selection apparatus calculates a similarity between the frequency feature information corresponding to the target fingerprint image and the frequency feature information corresponding to the enrolled fingerprint image. When the enrolled fingerprint image is determined to be different from the target fingerprint image, the candidate fingerprint selection apparatus selects a next image (for example, another enrolled fingerprint image) from the DB in operation 1042 and acquires frequency feature information corresponding to the next image in operation 1030.

When the enrolled fingerprint image is determined to be similar to the target fingerprint image, the candidate fingerprint selection apparatus selects the enrolled fingerprint image as a candidate fingerprint image in operation 1043. For example, the candidate fingerprint selection apparatus selects M candidate fingerprint images from N enrolled fingerprint images. In this example, M is an integer greater than or equal to 1 and is less than N.

Also, the candidate fingerprint selection apparatus determines a non-candidate fingerprint image among the enrolled fingerprint images based on a result obtained by comparing the frequency feature information to enrolled frequency information. The non-candidate fingerprint image is an image other than the selected candidate fingerprint image. The candidate fingerprint selection apparatus recognizes the target fingerprint image by excluding the non-candidate fingerprint image.

The candidate fingerprint selection apparatus determines whether the candidate fingerprint image matches the target fingerprint image. For example, the candidate fingerprint selection apparatus calculates a matching level between the candidate fingerprint image and the target fingerprint image. The matching level indicates a degree to which the candidate fingerprint image matches the target fingerprint image. When the matching level exceeds a threshold level, the candidate fingerprint selection apparatus determines that the candidate fingerprint image matches the target fingerprint image.

Figure 11:
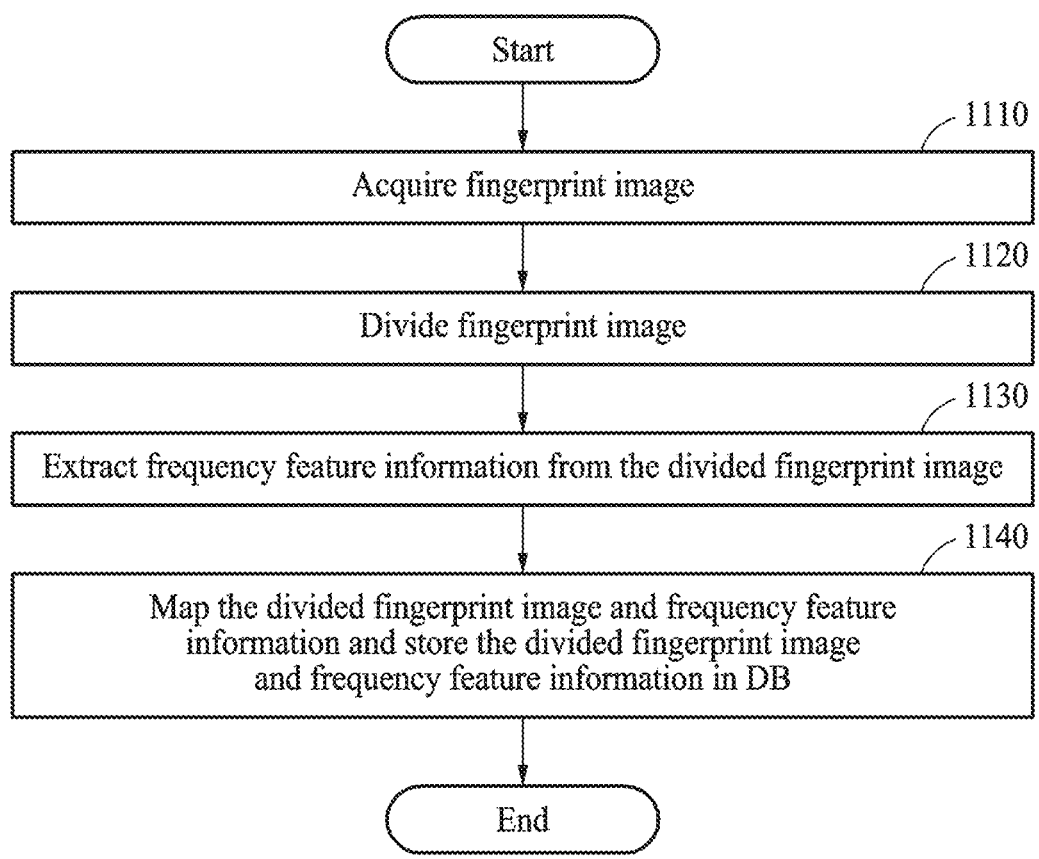
FIG. 11 is a flowchart illustrating an example of a fingerprint enrollment method.

FIG. 11 illustrates an example of a fingerprint enrollment method.

Referring to FIG. 11, in operation 1110, a candidate fingerprint selection apparatus acquires a fingerprint image. For example, the candidate fingerprint selection apparatus acquires an image associated with a fingerprint to be enrolled from a user. The candidate fingerprint selection apparatus acquires an image associated with a fingerprint to be enrolled by capturing a fingerprint image using a similar scheme to that of FIG. 1.

In operation 1120, the candidate fingerprint selection apparatus divides the fingerprint image. For example, the candidate fingerprint selection apparatus divides the fingerprint image in a predetermined size.

In operation 1130, the candidate fingerprint selection apparatus extracts frequency feature information from the divided fingerprint image. For example, the candidate fingerprint selection apparatus generates an enrolled frequency image by performing a frequency conversion of an enrolled fingerprint image, and extracts enrolled frequency feature information from the enrolled frequency image. The enrolled frequency feature information is information indicating a frequency feature of the enrolled frequency image, and includes, for example, a magnitude of a representative point included in the enrolled frequency image, a distance between an origin and a representative point, or distribution information of representative points.

In operation 1140, the candidate fingerprint selection apparatus maps the divided fingerprint image and the frequency feature information and stores the divided fingerprint image and the frequency feature information in a DB. For example, the candidate fingerprint selection apparatus maps enrolled frequency feature information and an enrolled frequency image to the enrolled fingerprint image and stores the enrolled frequency feature information, the enrolled frequency image and the enrolled fingerprint image in the DB.

Although not shown in FIG. 11, different configurations of the fingerprint enrollment method may exist. For example, in the case where no candidate fingerprint image matches a target fingerprint image by the end of the process shown in FIG. 10, it may be determined that the target fingerprint image should be enrolled. In this case, if no candidate fingerprint images or matching fingerprint images are found, then the determination may be made that the target fingerprint image should be enrolled. In such a case, for example, the target fingerprint image has already been acquired, divided, and frequency feature information has been mapped. Thus, in this case, the process of enrollment may start at step 1140, in which the divided fingerprint image and frequency feature information is stored in the DB as enrolled fingerprint images of a new user.

Figure 12:
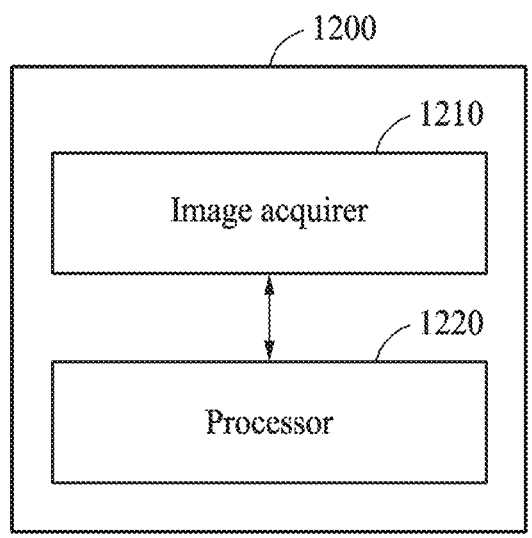
FIGS. 12 and 13 are block diagrams illustrating examples of a candidate fingerprint selection apparatus.
Figure 13:
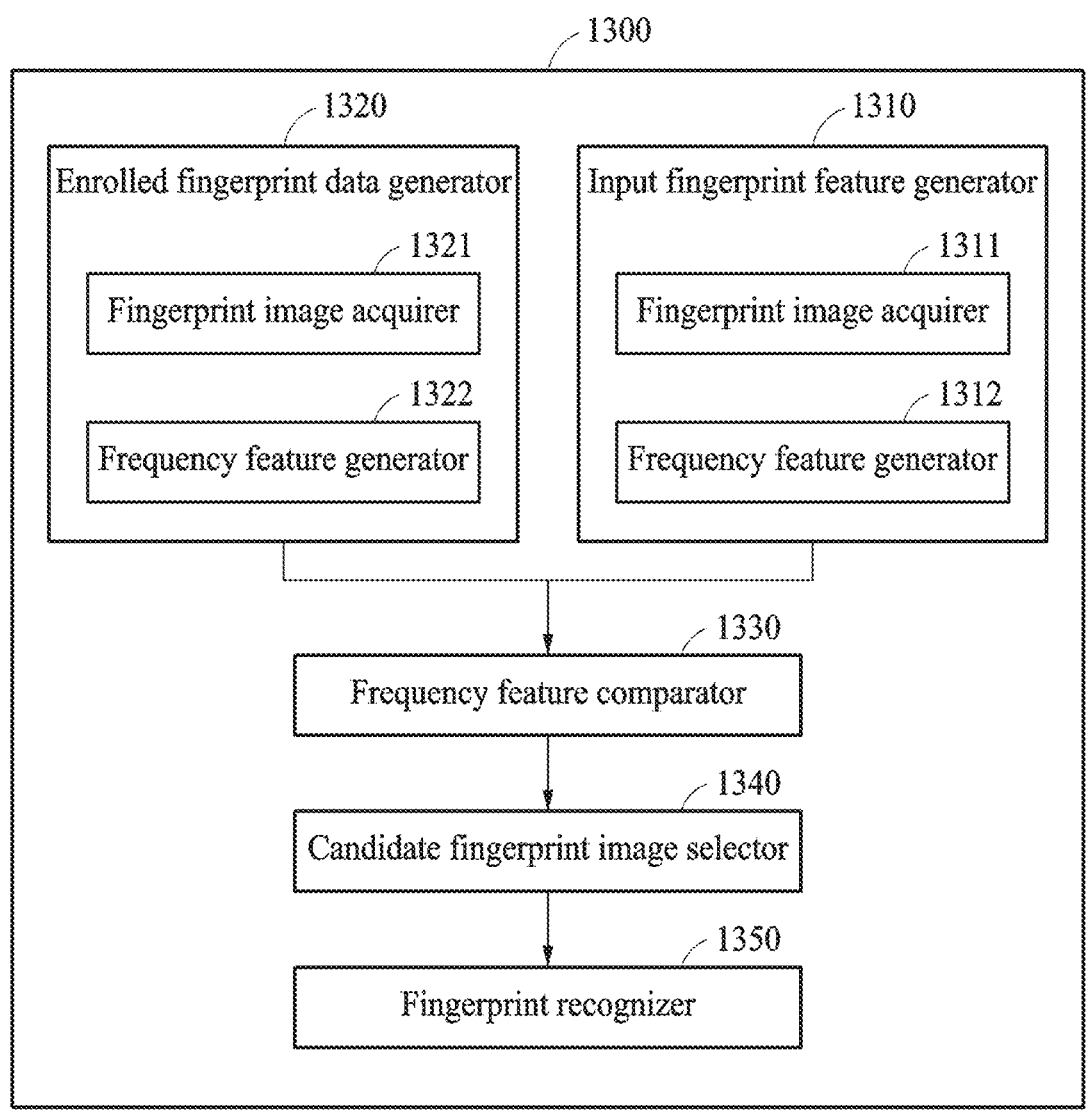

FIGS. 12 and 13 illustrate examples of candidate fingerprint selection apparatuses 1200 and 1300, respectively.

Referring to FIG. 12, the candidate fingerprint selection apparatus 1200 includes an image acquirer 1210 and a processor 1220.

The image acquirer 1210 acquires a target fingerprint image. For example, the image acquirer 1210 may include a fingerprint sensor.

The processor 1220 generates a target frequency image by performing a frequency conversion of the target fingerprint image, extracts frequency feature information associated with a representative frequency from the target frequency image, and selects a candidate fingerprint image from enrolled fingerprint images by comparing the frequency feature information to enrolled frequency information. However, an operation of the processor 1220 is not limited to the above operations, and accordingly the processor 1220 may perform the operations described above with reference to FIGS. 1 through 11.

Referring to FIG. 13, the candidate fingerprint selection apparatus 1300 includes an input fingerprint feature generator 1310, an enrolled fingerprint data generator 1320, a frequency feature comparator 1330, a candidate fingerprint image selector 1340 and a fingerprint recognizer 1350.

The input fingerprint feature generator 1310 includes a fingerprint image acquirer 1311 and a frequency feature generator 1312.

The fingerprint image acquirer 1311 acquires an input fingerprint image. The fingerprint image acquirer 1311 generates a target fingerprint image by dividing the input fingerprint image.

The frequency feature generator 1312 generates a target frequency image by converting the target fingerprint image to a frequency domain using a fast Fourier transform (FFT). The target frequency image is an image representing a frequency component of the target fingerprint image. Frequency feature information corresponding to the frequency component is feature information associated with a representative frequency, and includes, for example, information associated with a representative point with a greatest magnitude.

When a highest value (for example, a peak value) is found from the generated target frequency image, the frequency feature generator 1312 identifies a frequency position (u, v) (for example, a representative point) with a strongest frequency component as shown in FIG. 4. In an example, the frequency feature generator 1312 generates a representative distance between a representative point and a central point (for example, an origin) in the target frequency image as frequency feature information F. In another example, the frequency feature generator 1312 generates frequency feature information F (for example, a frequency feature vector) including distances (for example, f1, f2, f3 or fn) to representative points with top n peak values by arranging points based on magnitude values as shown in FIG. 8. In this example, n is an integer greater than or equal to "1."

The enrolled fingerprint data generator 1320 includes a fingerprint image acquirer 1321 and a frequency feature generator 1322.

The fingerprint image acquirer 1321 acquires a fingerprint image that is to be enrolled. For example, the fingerprint image acquirer 1321 operates similarly to the fingerprint image acquirer 1311, or is implemented by, for example, the same module as the fingerprint image acquirer 1311.

The frequency feature generator 1322 generates an enrolled frequency image from the acquired fingerprint image using an FFT. The frequency feature generator 1322 operates similarly to the frequency feature generator 1312, or is implemented by, for example, the same module as the frequency feature generator 1312.

The frequency feature comparator 1330 compares an enrolled frequency image calculated from an enrolled fingerprint image to a target frequency image calculated from a target fingerprint image. For example, the frequency feature comparator 1330 calculates a similarity between frequency feature information extracted from the enrolled frequency image and frequency feature information extracted from the target frequency image.

The candidate fingerprint image selector 1340 selects a candidate fingerprint image based on the calculated similarity. For example, the candidate fingerprint image selector 1340 determines an enrolled fingerprint image with a similarity greater than a threshold as a candidate fingerprint image for a currently acquired target fingerprint image.

The fingerprint recognizer 1350 recognizes a fingerprint of a user. For example, the fingerprint recognizer 1350 calculates a matching level between the candidate fingerprint image and the target fingerprint image. When the candidate fingerprint image matches the target fingerprint image, the fingerprint recognizer 1350 recognizes a user corresponding to the candidate fingerprint image.

According to examples, when an input fingerprint is the same as an enrolled fingerprint, a representative distance (for example, the representative distance f1 or f1' of FIG. 8) from a central point of an image has a similar value or the same value, even though a frequency position of a representative point with a peak value changes by rotation of a target fingerprint image. Thus, a candidate fingerprint selection apparatus quickly verifies whether the target fingerprint image is similar to an enrolled fingerprint image. For example, when a similarity between an arbitrary enrolled fingerprint image and the target fingerprint image is greater than a threshold, the candidate fingerprint selection apparatus determines the enrolled fingerprint image as a candidate fingerprint image and attempts recognition. In this example, the target fingerprint image corresponds to one of sub-blocks into which an input fingerprint image is divided.

Thus, the candidate fingerprint selection apparatus quickly excludes an enrolled fingerprint image with a distinctly different frequency component from enrolled fingerprint images and performs comparison, and accordingly it is possible to enhance a fingerprint recognition speed. The candidate fingerprint selection apparatus is utilized in, for example, unlocking of a mobile terminal or a mobile payment.

The candidate fingerprint selection apparatus is robust against a change in a shape due to a pressure to press a fingerprint sensor to acquire a fingerprint. When a plurality of enrolled fingerprint images are stored, the candidate fingerprint selection apparatus quickly selects an image with a similar characteristic to that of an input fingerprint image from the enrolled fingerprint images based on a frequency feature of a fingerprint image and attempts recognition, and thus it is possible to enhance a recognition speed and an accuracy.

The apparatuses, units, modules, devices, and other components illustrated in FIGS. 12 and 13 that perform the operations described herein with respect to FIGS. 2, 3, 7, 10 and 11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3, 7, 10 and 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of selecting a candidate fingerprint image for fingerprint recognition, comprising:
    acquiring a target fingerprint image;
    generating a target frequency image based on a frequency conversion of the target fingerprint image;
    extracting frequency feature information associated with a representative frequency from the target frequency image; and
    selecting a candidate fingerprint image from enrolled fingerprint images by comparing the frequency feature information to enrolled frequency information,
    wherein the extracting of the frequency feature information comprises:
        selecting a preset number of representative points based on a magnitude order from a plurality of points included in the target frequency image; and
        extracting frequency information associated with the selected representative points as the frequency feature information, and
    wherein the extracting of the frequency information associated with the selected representative points as the frequency feature information comprises calculating a frequency feature vector based on a representative distance between the selected representative points and an origin included in the target frequency image.

2. The method of claim 1, further comprising:
    determining whether the candidate fingerprint image matches the target fingerprint image.

3. The method of claim 2, wherein the determining of whether the candidate fingerprint image matches the target fingerprint image comprises:
    calculating a matching level between the candidate fingerprint image and the target fingerprint image; and
    determining that candidate fingerprint image matches the target fingerprint image in response to the matching level exceeding a threshold level.

4. The method of claim 1, wherein the acquiring of the target fingerprint image comprises:
    acquiring an input fingerprint image; and
    acquiring the target fingerprint image by dividing the acquired input fingerprint image into sub-blocks.

5. The method of claim 1, wherein the extracting of the frequency feature information comprises extracting frequency information associated with a ridge of a fingerprint included in the target fingerprint image from the target frequency image.

6. The method of claim 1, wherein the extracting of the frequency feature information comprises extracting, from the target frequency image, any one or any combination of any two or more of a frequency distribution, frequency information representing a ridge interval of a fingerprint included in the target fingerprint image, and frequency information representing a ridge direction of the fingerprint.

7. The method of claim 6, wherein the frequency information representing the ridge interval comprises information associated with the representative distance between the representative points and the origin included in the target frequency image.

8. The method of claim 6, wherein the frequency information representing the ridge direction comprises information associated with a magnitude of the representative points.

9. The method of claim 1, wherein the selecting of the candidate fingerprint image comprises:
    comparing target frequency information of the enrolled fingerprint images to target frequency information determined based on any one or any combination of any two or more of a frequency distribution, a frequency representing a ridge interval of a fingerprint included in the target fingerprint image, and a frequency representing a ridge direction of the fingerprint, and
    determining a similarity based on the comparing of the target frequency information of the enrolled fingerprint image.

10. The method of claim 1, wherein the extracting of the frequency information associated with the selected representative points comprises:
    determining, as the frequency feature information, a magnitude of the representative points and the representative distance between the representative points and the origin included in the target frequency image.

11. The method of claim 1, wherein the selecting of the representative points comprises determining a point with a greatest magnitude among the points included in the target frequency image as one of the representative points.

12. The method of claim 1, wherein the acquiring of the target fingerprint image comprises acquiring an input fingerprint image having a same size as an enrolled fingerprint image.

13. The method of claim 1, further comprising:
    determining a non-candidate fingerprint image among the enrolled fingerprint images based on a result of the comparing of the frequency feature information to the enrolled frequency information; and
    recognizing the target fingerprint image by excluding the non-candidate fingerprint image.

14. The method of claim 1, further comprising:
  extracting enrolled frequency feature information by performing a frequency conversion of an enrolled fingerprint image; and
  mapping the enrolled frequency feature information and the enrolled fingerprint image and storing the enrolled frequency feature information and the enrolled fingerprint image in a database (DB).

15. The method of claim 1, wherein the extracting of the frequency information associated with the selected representative points comprises extracting distribution information of the representative points from the target frequency image, wherein the representative points have magnitudes greater than or equal to a threshold magnitude.

16. The method of claim 15, wherein the extracting of the frequency feature information comprises extracting the frequency feature information by excluding a point corresponding to a frequency component that is less than a threshold frequency from the target frequency image.

17. The method of claim 1, wherein the selecting of the candidate fingerprint image comprises:
  in response to a plurality of representative points being extracted from the target frequency image, calculating a similarity between the target frequency image and an enrolled frequency image based on any one or any combination of any two or more of a difference between the representative distance and a representative distance of an enrolled frequency image, a vector distance between the frequency feature vector and a frequency feature vector of the enrolled frequency image, and a cosine similarity between the frequency feature vectors.

18. The method of claim 1, wherein the selecting of the candidate fingerprint image comprises selecting, as the candidate fingerprint image, an enrolled fingerprint image of which a similarity between the frequency feature information and the enrolled frequency information is greater than a threshold.

19. A non-transitory computer-readable storage medium storing instructions that, when executed by a processor, cause the processor to perform the method of claim 1.

20. An apparatus for selecting a candidate fingerprint image for fingerprint recognition, the apparatus comprising:
  an image acquirer configured to acquire a target fingerprint image; and
  a processor configured to
    generate a target frequency image by performing a frequency conversion of the target fingerprint image,
    extract frequency feature information associated with a representative frequency from the target frequency image, and
    select a candidate fingerprint image from enrolled fingerprint images by comparing the frequency feature information to enrolled frequency information,
  wherein the processor is further configured to
    select a preset number of representative points based on a magnitude order from a plurality of points included in the target frequency image, and
    extract frequency information associated with the selected representative points as the frequency feature information by calculating a frequency feature vector based on a representative distance between the selected representative points and an origin included in the target frequency image.

\* \* \* \* \*